United States Patent [19]

Kakiuchi

[11] E Patent Number: Re. 33,040

[45] Reissued Date of Patent: Aug. 29, 1989

[54] ELECTROCHROMIC DISPLAY DEVICE

[75] Inventor: Hiroshi Kakiuchi, Tokyo, Japan

[73] Assignee: Kabushiki Kaisha Daini Seikosha, Tokyo, Japan

[21] Appl. No.: 55,186

[22] Filed: May 28, 1987

Related U.S. Patent Documents

Reissue of:

[64] Patent No.: 4,519,930
Issued: May 28, 1985
Appl. No.: 456,787
Filed: Jan. 10, 1983

[30] Foreign Application Priority Data

Jan. 11, 1982 [JP] Japan ..... 57-2622
Sep. 7, 1982 [JP] Japan ..... 57-156065

[51] Int. Cl.[4] ..... G02F 1/17; C09K 3/00

[52] U.S. Cl. ..... 252/62.2; 252/408.1; 252/600; 252/536; 315/169.3; 340/785; 340/812; 350/343; 350/356; 350/357; 313/385

[58] Field of Search ..... 252/62.2, 408.1, 536, 252/600; 315/169.3; 340/785, 812; 313/385; 350/343, 356, 357

[56] References Cited

U.S. PATENT DOCUMENTS

| | | | |
|---|---|---|---|
| 3,840,287 | 10/1974 | Witzke et al. | 350/160 R |
| 4,116,545 | 9/1978 | Reddy | 350/357 |
| 4,312,929 | 1/1982 | Randin | 350/357 |
| 4,335,938 | 6/1982 | Giglia et al. | 350/357 |
| 4,354,741 | 10/1982 | Mano et al. | 350/357 |
| 4,361,385 | 11/1982 | Huang et al. | 350/357 |
| 4,376,569 | 3/1983 | Barltrop et al. | 350/357 |

FOREIGN PATENT DOCUMENTS

| | | | |
|---|---|---|---|
| 54-99787 | 8/1979 | Japan | 340/785 |
| 1356120 | 6/1974 | United Kingdom . | |
| 2014326 | 8/1979 | United Kingdom . | |

*Primary Examiner*—T. Tung
*Assistant Examiner*—Kathryn Gorgos
*Attorney, Agent, or Firm*—Bruce L. Adams; Van C. Wilks

[57] ABSTRACT

An electrochromic display device containing at least two electrodes and electrolyte in contact therewith is disclosed, wherein the electrolyte is an electrolytic solution which has been gelated by polymer.

25 Claims, 3 Drawing Sheets

ELECTROCHROMIC DISPLAY DEVICE

Matter enclosed in heavy brackets [ ] appears in the original patent but forms no part of this reissue specification; matter printed in italics indicates the additions made by reissue.

BACKGROUND OF THE INVENTION

This invention relates to the electrolyte of an electrochromic [display] *optical* device, and more particularly, to the reform of the function by gelating the electrolyte.

In electrochromic *optical devices, such as* display devices, usually an electrolyte solution has been used as the electrolyte. But when a solution is used, there have been problems such as the trapping of air bubbles or the destruction of the panel because of the difference in the rate of expansion between the panel and the liquid. To avoid these problems, use of a solid electrolyte has been considered, especially for the proton conductor, metal oxide thin films (e.g. silicon dioxide, tantalum oxide, etc). But these solid electrolytes have the defect of exhibiting a large electrical resistance. So that these devices exhibited a slow response required a large drive voltage. Furthermore, for these solid electrolytes the contacts between the electrochromic electrodes and the electrolytes, or between the counter electrodes and the electrolytes, have generally been considered as unreliable, i.e. in the case of a liquid, because of the fluidity of the liquid the contact could be expected to be enough, but, in the case of a solid, stripping could occur; especially when the external voltage has been applied for a long time, and this is an important factor affecting the device stability.

So far, the use of a gelated electrolyte solution has been tried, but, till now, these trials simply used an existing gelating reagent by mixing it with the electrolyte solution. As a result, the applied electric field was limited, and the technique could not be applied to arbitrary electrolyte solutions. Moreover the patterning of the electrolyte was difficult according to the prior art gelated electrolyte.

BRIEF SUMMARY OF THE INVENTION

One object of this invention is to overcome the aforementioned defects of electrolyte solutions and solid electrolytes, and to provide a solid electrolyte which has an ionic conductivity comparable to that of the liquid electrolyte and which has an electrode-electrolyte contact as reliable as that of the liquid electrolyte, and which can be used for a variety of electrolyte solutions.

Another object of this invention is to obtain a gel electrolyte which can be readily patterned.

DETAILED DESCRIPTION OF THE INVENTION

In accordance with the basic principle of this invention the liquid electrolyte is gelated by a polymer which absorbs the liquid electrolyte and swells to form a gel.

According to this method, if a sufficient quantity of liquid is contained in the polymer, it is expected that the comparable conductivity of the thus gelated electrolyte to that of liquid liquid and the electrode-electrolyte contact will be as reliable as that of liquid electrolyte. The problem is to obtain a polymer which absorbs sufficient liquid electrolyte and swells in specified solvents. In accordance with this invention, two methods are proposed to construct such polymers.

A method is required whereby the solubility of polymer can be changed continuously. The first method for changing the solubility is to increase the molecular weight of the polymer by cross-linking, and the second method is to prepare a copolymer from monomer which when polymerized yields soluble polymer and monomer which when polymerized yields insoluble polymer and to change the copolymerization ratio of these monomers.

The following examples further illustrate the invention.

EXAMPLE 1

For propylene carbonate, which is widely used as a solvent for a tungsten oxide electrochromic display device a search was made for a polymer which would absorb this solvent and swells. Whether a soluble polymer is cross-linked or monomer which forms soluble polymer and monomer which forms insoluble polymer is copolymerized, as mentioned before, a polymer soluble in propylene carbonate must be found first. A solubility resulted in differentiation between polymer and soluble in propylene carbonate polymer insoluble in propylene carbonate as set forth below.

* Soluble polymer polyvinyl acetate, polymethyl methacrylate, polymethyl acrylate, polyvinylpyrrolidone, polyvinylpyridine

* Insoluble polymer polystyrene, polyvinyl chloride, polyethylene, polypropylene, polyvinyl carbazole.

According to the first method, for every one of the soluble polymers, the corresponding monomer and diviylbenzene are copolymerized, and the copolymerizaon ratio at which the resulting polymer swells is invesgated.

On the other hand, according to the second method, ıvolving a copolymer containing soluble polymer and ısoluble polymer, polyvinyl acetate and ethylene will e considered. A set of samples in which the copolyıerization ratio is varied was obtained and the swelling roperty of these samples was tested.

Figure 1:
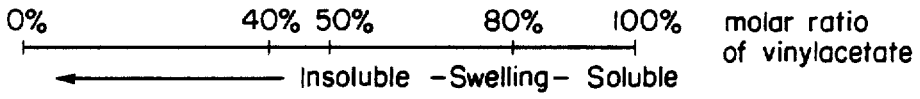
FIG. 1 indicates the variation of solubility of a polymer to propylene carbonate when the copolymerization ratio is changed.

According to these results, the FIG. 1 was obtained, nd it was revealed that at an 80%-vinyl acetate ratio ıe polymer swells.

Figure 2:
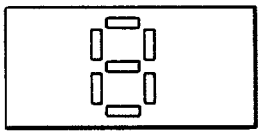
FIG. 2 indicates the display pattern used in the examples of the invention.
Figure 3:
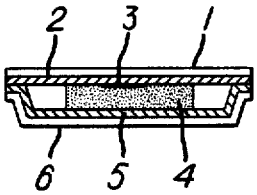
FIG. 3 is a cross-sectional view of the display panel used in the examples.

In these swelling polymers, vinyl acetate-ethylene opolymer and vinyl acetate-divinylbenzene copolymer divinylbenzene is contained at 0.1%) were used as the lement of the cells and of the display panels. In these isplay panels tungsten oxide was vacuum evaporated ı the shape shown in FIG. 2. Tungsten oxide was evaprated at a pressure $1\times10^{-5}$ torr and heated by a resis-ve heater. The thickness of the films is 5000 Å and it vas evaporated on ITO films, which stands for Indium in Oxide transparent films. The sliced view of the anels which include the above electrochromic films is hown in FIG. 3, where the glass plate, 1 covers, the TO film 2 which, holds the evaporated tungsten oxide ilm 3; the swelled polymer 4 which contains propylene arbonate and lithium perchlorate is located between he tungsten oxide film 3 and, the evaporated gold film , a glass plate 6 is settled below. The display panel ıade as above can be colored and bleached by the pplication of +1.5 V. The response time was comparale to that of liquid i.e. 0.5 sec.

This same result was obtained for vinyl acetate-ethyene copolymer and for vinyl acetate-divinylbenzene opolymer.

A more detailed investigation was made for vinyl cetate-ethylene copolymer.

Figure 4:
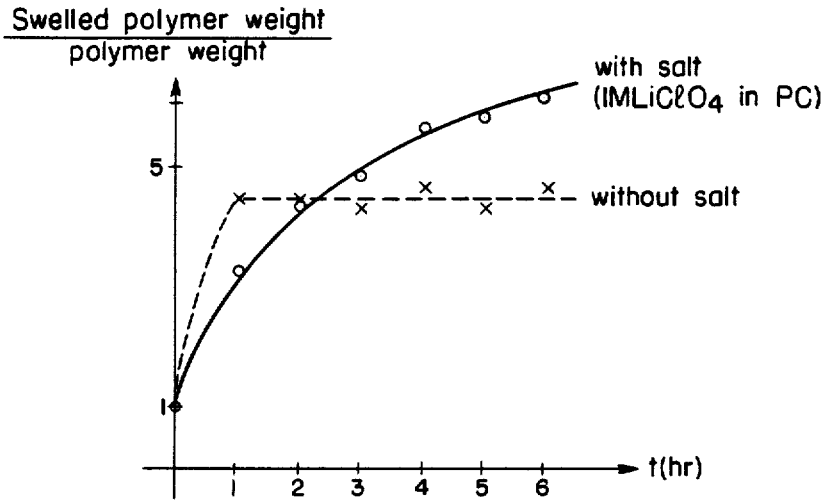
FIG. 4 indicates the polymer weights when the polymer is swelled by propylene carbonate with and without 1M lithium perchlorate.

FIG. 4 indicates the time variation of the degree of welling measured by the weight increase with and vithout the electrolyte salt. As seen from this result, the ıolymer becomes about six times heavier than before welling.

This indicates the amount of the liquid absorbed.

Figure 5:
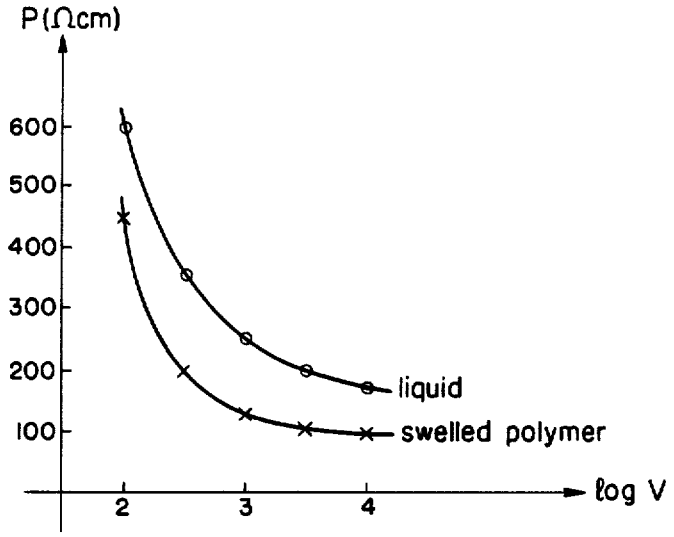
FIG. 5 indicates the comparison of the conductivity between liquid and a swelled polymer which absorbs a 1M lithium perchlorate propylene carbonate solution at different frequencies.

On the other hand, the conductivity was measured on his swelled polymer as shown in FIG. 5. As seen from his figure, the swelled polymer (vinyl acetate-ethylene) ıas the prominent property of a resistance which is ower than that of the liquid. The reasons for this result ı not obvious, but it is possible that the existance of ıolymer prevents the formation of an ion-pair in the lectrolyte. To describe in detail, in more solving lithum perchlorate in propylene carbonate, too much salt nakes the conductivity of liquid lower. From this it is nferred that the positive and negative ions form an on-pairs and that these ions forming ion-pair can not contribute to the conductivity. So that, if the ion-pair ormation is prevented somehow the conductivity will ncrease.

EXAMPLE 2

The gelation of the liquid electrolyte wherein the olvent is carried out acetonitrile is Polymers are differntiated with respect to solubility and insolubility in cetonitrile.

' Soluble polymer olyvinyl acetate, polymethyl methacrylate, polynethyl acrylate.

' Insoluble polymer polystyrene, polyethylene, polyvinyl chloride polypropylene.

According to the first method, swelled polymer was obtained by the copolymerization with divinylbenzene. On the other hand according to the second method, a swellable vinylacetate-ethylene copolymer was obtained. This polymer was caused to absorb 0.1M tetraethylammonium perchlorate acetonitrile liquid, and used in the cell described in Example 1. A response comparable to that of the electrolyte liquid was obtained. Further, a high vapour pressure brought about the destruction of cells at high temperature in the case of liquid electrolyte. But when using gelated electrolyte, this accident was avoided.

EXAMPLE 3

As in Example 1, for electrochromic films made of molybdenium oxide, the same kinds of effects were obtained in the case of the same polymers and solutions as Example 1.

EXAMPLE 4

As in Example 2, for electrochromic films made of molybdenium oxide, the same kinds of effects were obtained in the case of the same polymers and solutions as Example 2.

Of course, the aqueous solution could be gelated in the same manner, but another material will be used as the aqueous solution as below.

To consider polyvinyl alcohol as the water-soluble polymer, cross-linkage can be realized by esterification as follows.

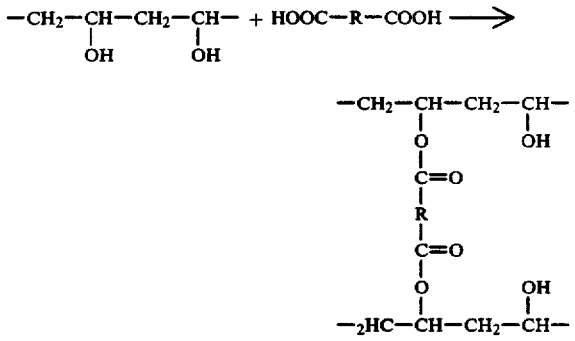

i.e. hydroxy groups in polyvinyl alcohol are esterified with the carboxylic acid groups and form the ester bond. When this process is carried between the two polymer chains, cross-linkage should occur. So the cross-linking reagent is the dicarboxylic acid. Of course, the anhydride for the dicarboxylic acid can also be used.

Generally the cross-linked polymer is insoluble in any solvent because of its extremely high molecular weight, so it is difficult to form these polymers as the electrolyte layer on the ITO film. To avoid this difficulty, it is desirable to form the film using a polymer solution before cross-linkage is performed.

So first, polymer and cross-linking reagent are mixed in water, and then the solution is expanded on the glass substrate and dried.

Then, cross-linkage is performed in the film. Now, this invention will be illustrated further by the following examples.

EXAMPLE 5

As the cross-linking reagent, pyromellitic dianhydride will be examined. Polyvinyl alcohol was dissolved in water in a 10 wt% ratio, and then pyromellitic dianhydride was added to it with 0.02, 0.04, 0.06, 0.08, 0.1 cross-linking agent/polymer weight ratio. Pyromellitic dianhydride was dissolved at c.a. 80° C. The solution arranged as above was expanded on the glass plate and dried on the hot plate at c.a. 80° C.

Figure 6:
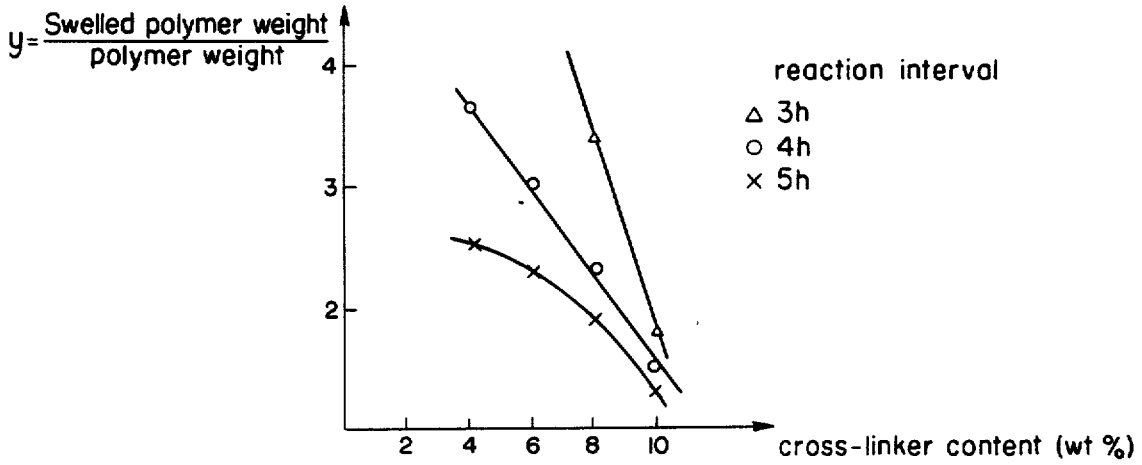
FIG. 6 shows the water absorbance of the cross-linked polymer when pyromellitic anhydride was used as the cross-linking agent and, the reaction interval and the cross-linking agent and, the reaction interval and the amount of cross-linking agent were changed.

Then the transparent film was formed without the recrystallization of pyromellitic dianhydride. This film was cross-linked in the furnace at 120° C. The reaction intervals were set as 1 hr. 2 hr. 3 hr. 4 hr. 5 hr. The results are indicated in FIG. 6. From these results, it can be recognized that at least 2% by weight of cross-linking agent is needed to form the insoluble film, and the largest amount of water is absorbed by polymer having a 0.04 weight ratio of cross-linking agent and 4 hr. reaction interval. The weight of the polymer becomes 3.5 times heavier than that before absorption. This fact indicates that the absorbed water is 2.5 times heavier than that of polymer.

The polymer obtained as above would be the solid electrolyte when it is made to absorb the electrolyte solution. The above conditions of cross-linking i.e. 0.04 weight ratio and 4 hr reaction interval were set, and the resultant polymer was caused to absorb 1M KCl electrolyte.

Figure 7:
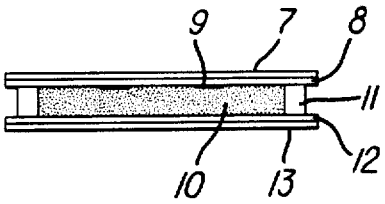
FIG. 7 is the cross-sectional view of the display device used in the examples.

This solid electrolyte was used in the display panel illustrated in FIG. 7. Here, the glass plate 7 covers the transparent conducting film 8 which is made of tin oxide, and is coated with the electrochromic electrode 9 which is made of Prussian blue film.

Figure 8:
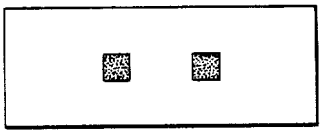
FIG. 8 is the display pattern of the display device.

This Prussian blue film was formed on the electrode by the electrolytic reduction on tin oxide electrode in a mixture solution of potassium ferricyanide and ferric chloride. The solid electrolyte 10 mentioned above, is in contact with the electrode 9 and held in place by the glass spacer 11. The glass substrate 13 is covered with the chromium-gold evaporated film 12 used as the counter electrode. The display pattern of this panel is illustrated in FIG. 8. The displayed information could be moved from left pattern to right or vice versa by voltage application.

In the display device as above, the Prussian blue film was blue when it was just formed, the bleaching was performed by connecting the display film with the counter electrode. The display electrode was 4 $mm^2$ in area, and the electric charge density used to display was 6 m $c/cm^2$.

So the requisite charge was 240 uC. The bleaching was performed by the constant current 10 uA with a time interval of 24 sec. Then between the colored film and the bleached film the external voltage was applied with 0.7 v so that the colored film was at a lower potential. Then the blue color moved from one side to the other. The response time was 5 sec. When liquid electrolyte was used the response time was 2 sec. So this shows a slower response when the gelated film was used.

EXAMPLE 6

The display device as in Example 5, and under the same cross-linking conditions, the dried film was made to contain the electrolyte before absorbing the solution i.e. polyvinyl alcohol was dissolved in 10% by wt. of 1M KCl solution. Pyromellitic dianhydride was mixed with the solution in a 0.04 cross-linking agent/polymer weight ratio. The cross-linking conditions were 120° C., 4 hr. The cross-linked film was made to absorb the water. This film was used in the same display device as Example 5, and evaluated. The response time was 4 sec., a little faster than Example 5.

EXAMPLE 7

In this example, the Prussian blue electrode was formed on the gold electrode indicated in FIG. 7.

The drive was performed between an upper Prussian blue display electrode and a lower Prussian blue counterelectrode. In this case, the Prussian blue counter electrode did not have a clear looking Prussian blue display, so titanium white was dispersed in the cross-linked polyvinyl alcohol film as follows.

A 10 wt% polyvinyl alcohol 1M KCl solution was prepared with titanium oxide, which had been ground to a fine powder by a pestle. Pyromellitic dianhydride was mixed with above solution in an amount such that the cross-linking agent weight ratio was 0.04.

This film was cross-linked under the same cross-linking conditions as Example 6. Then this film was made to absorb water, and used in the display device illustrated as above.

When external voltage of 0.7 v was applied between the display film and the counter electrode so that the display film potential was lower, the displayed color was bleached and became white because of the titanium white. The response time was 2 sec., i.e., the same value as that of the liquid.

The faster response is the result of the shorter distance between the electrodes. In Examples 5 and 6, the current flowed between two display electrodes, but in Example 3, the current flowed between the display electrode and the counterelectrode. Then the thinner the display cell is, the lower the resistance of electrolyte and the faster the response time.

As it is clear from above examples, the conductivity of cross-linked polyvinyl alcohol is lower than that of the liquid. But if the thickness of the cell is thin enough, the response time becomes comparable with that of the liquid.

The reason is the existence of the interfacial resistance of the display film. This resistance is independent to the cell thickness. Then when the cell thickness is thin enough, the resistance of the electrolyte becomes unimportant for the response.

EXAMPLE 8

In this example, maleic acid was used as the cross-linking agent. As in Example 5, 10 wt% polyvinyl alcohol solution was prepared. Maleic acid was added in an amount for the cross-linking agent/polymer weight ratio to be 0.1. The cross-linking conditions were 130° C., 1 hr. The resultant polymer film was made to absorb the electrolyte, but the polymer didn't conserve the film shape. It was like a finely cut gelatin i.e. gelation did occur, but a definite shape was lost. This polymer also could be used in the display device. This can avoid air-bubbles, too. The display device constructed as above was driven in the same manner as Example 5, and the display pattern was moved from left to right and vice versa with a response time of 2 sec.

EXAMPLE 9

In this example the maleic acid was used at the different cross-linking conditions of 130° C., 4 hr.

The maleic acid was added in an amount so that the ross-linking agent/polymer weight ratio to 0.04. The esult was half-gelated polymer as in Example 8. The vater swelled polymer brought the same result as in xample 8.

From Examples 8 and 9, when maleic acid is used, it impossible to form a film, because of the difference of eactivity between anhydride and acid. Anhydride will eact under milder conditions.

EXAMPLE 10

In this example, cross-linking was performed in the ime manner as in Example 5, but the cross-linking gent was adipic acid. The film form was not obtained t the condition, 130° C., 4 hr, 0.04 cross-linking agent-polymer ratio,. But the problem of air-bubbles was olved as before.

EXAMPLE 11

In this example maleic anhydride was used under the ime cross-linking conditions as Example 6.

In this case, film electrolyte was obtained. This film vas used in the display device illustrated in FIG. 7, and vas driven as in Example 6, i.e. the coloring charge was ioved from left to right and vice versa. The response me was also 4 sec.

EXAMPLE 12

The same cross-linking agent as in Example 5 was sed, but in this example, polyvinyl alcohol was not issolved in 1M KCl solution, but in 1M $KClO_4$ solu-on. The cross-linked polyvinyl alcohol was made inder the same cross-linking conditions as in Example ) from this solution and was made to absorb water to orm solid electrolyte. This solid electrolyte was used in ie display device illustrated in FIG. 7. In this example, ingsten oxide was used for Prussian blue. A tungsten xide film was formed by vacuum evaporation.

Tungsten oxide was evaporated to a clear film. This isplay film was colored by a coloring charge 240 uC vhich was injected from the gold electrode with con-ant current. The coloring charge was moved between ie two tungsten oxide films by the external voltage of .5 V. The response time was 2 sec. The response time, vhen the liquid was used, was 0.5 sec.

EXAMPLE 13

As in example 7, titanium white was mixed when the lm was formed in Example 12 and drive was per-ormed between the counterelectrode. In this example ie counterelectrode was gold and the applied voltage vas +1.2 V. The response time was 0.5 sec, the same alue as with the liquid electrolyte.

Explained as above, this invention is applicable to lectrochromic devices which use an aqueous solution. he response time can be the same order as with the quid electrolyte by using a thinner cell. Further, this ivention solves the problem of air-bubbles.

The gelated solutions so far, are mostly formed from ross-linked polymers which absorb the corresponding quid. But according to this method, the polymer at-ached to a panel strips away, because the polymer bsorbs the liquid and swells substantially, so that the ormation of the solid electrolyte becomes very diffi-ult. Here, an improved method is proposed in which ie obtained gel is drier, and adheres to the electrode ven in its gel form.

The method involves the polymerization of a mixture of electrolyte solution, monomer and cross-linking agent to form the gel. Now this embodiment of the invention will be illustrated by the following examples.

EXAMPLE 14

Attempts have been made to gelate propylene carbonate which is widely used as a solvent for $WO_3$ electrochromic film by this invention. Generally this solvent is used as a 1M $LiClO_4$ electrolyte solution. So in this example also, this electrolyte was used. As methyl acrylate polymer is soluble in propylene carbonate, methyl acrylate monomer was added to

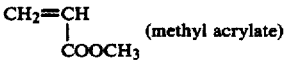

the above electrolyte solution. This solution can't be polymerized to a gel form, instead it becomes viscous. A divinyl compound is needed as the cross-linking agent. Here divinylbenezene was used. The initiator was azobisisobutylonitrile.

Figure 9:
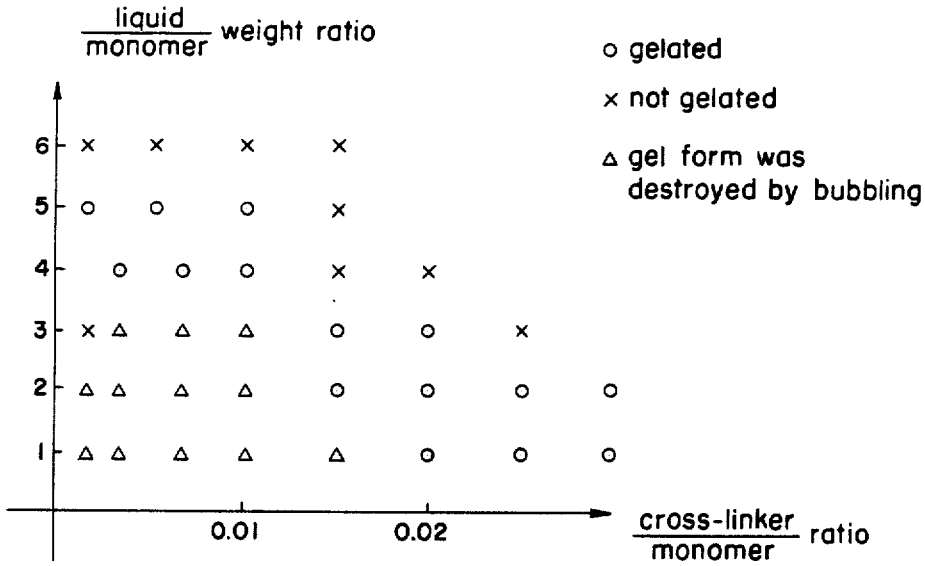
FIG. 9 indicates the gel appearance when propylene carbonate is gelated by methyl acrylate and divinylbenzene with a variation of liquid/monomer and divinylbenzene/monomer ratio.

The weight of azobisisobutylonitrile was 0.005 of the monomer. The temperature was 50° C., the reaction interval was 1 hr. Under these polymerizing conditions the appearance of the formed gel was investigated. The results are indicated in FIG. 9. As is clear from this data, the requisite quantity of divinylbenzene is different according to the quantity of liquid, and too much cross-linking agent and too little cross-linking agent are both undesirable.

The resistance of the resultant gel was measured on the gel which contains five times as much liquid as monomer. Its value was 244 Ωcm., while that of the liquid is c.a. 300 Ωcm. The resistance of gel was a little lower than that of the liquid.

Figure 10:
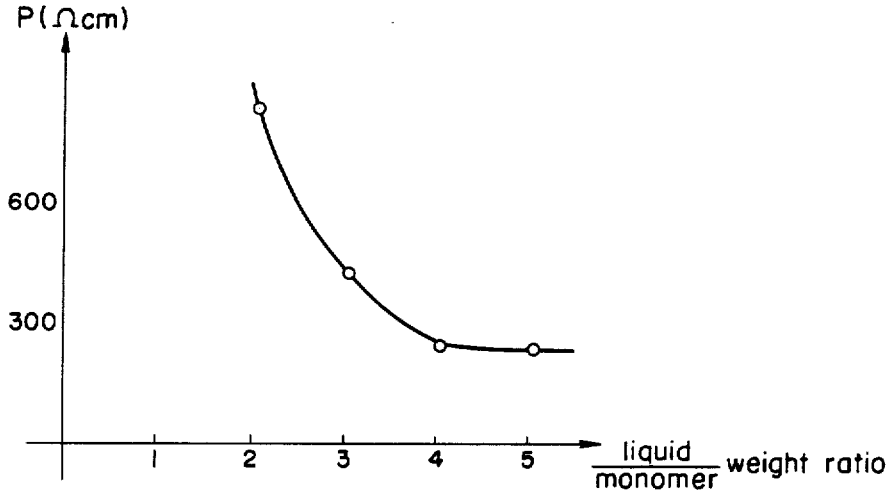
FIG. 10 indicates the variation of resistance when the liquid/monomer ratio is varied.

As is clear from this result, the conductivity of the gel prepared as above is by no means inferior to that of liquid. To be clearer, the variation of the conductivity with the mixing ratio of liquid and monomer was measured. In this case the conductivity was independent from the quantity of cross-linking agent. The results are indicated in FIG. 10.

As is known from these results, the conductivity of the gel became constant at a liquid/monomer ratio of 4, and at this stage the conductivity was a little lower than that of the liquid.

Further using the method of preparation explained above, resulted in a product having an important property compared with that of the ordinary method. In the ordinary method, first cross-linked polymer is synthesized, then the cross-linked polymer is treated to absorb the liquid. But, in such method the surface of the polymer is completely wet, so that it won't stick to anything. Compared with such case, the swelled polymer prepared by this invention has a drier surface than ordinary.

Of course, it was not as dry as an ordinary solid, but it will stick to other surfaces. Especially when the liquid/monomer ratio is greater than three, the surface became so adhesive that it can adhere e.g. to glass or a human finger. This characteristic is very advantageous for the fabrication of display cells. For example, and all solid type cell can be fabricated by laying the element layers i.e. display electrode solid electrolyte, counter-electrode, step by step.

In this case, if the electrolyte is adhesive as discussed above, the electrolyte can adhere to the display electrode, and the counterelectrode and its position is fixed. But if the electrolyte is wet, the electrolyte can't adhere, and can't be fixed. It is very inconvenient. But the more important result is that the adhesive polymer can be stuck to the resist film. This indicates that the polymer can be patterned by ordinary photolithography. But if the polymer is wet, the resist film can't be laminated on it.

Figure 11:
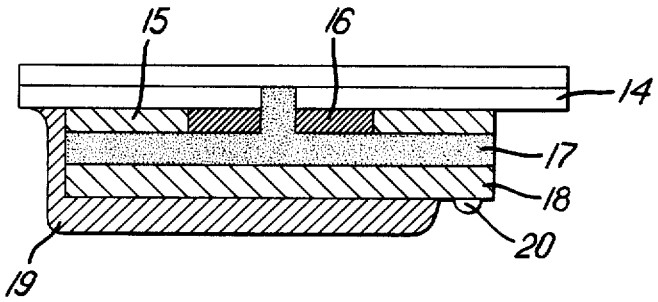
FIG. 11 is the cross-sectional view of the display device used in the examples.

A display cell has been constructed using this solid electrolyte after the elementary measurement as above. The display electrode was tungsten oxide. The cross-sectional view of the cell employed is indicated in FIG. 11.

This display device was fabricated as below. First, the glass plate 14 which had the transparent conducting film on it was made and the transparent conducting film was patterned. Then the insulator film 15 was patterned. Tungsten oxide 16 was evaporated and patterned using a metal mask. The solid electrolyte 17 film explained above was stuck on top of the insulator film 15 and the tungsten oxide 16.

The film 17 was formed by polymerizing the mixture of monomer and electrolyte solution in a mold at 50° C. for 1 hr. The mixture used had a liquid/monomer weight ratio of 4. After the addition of the electrolyte, the counterelectrode was printed. The counterelectrode 18 was fabricated by evaporating a polymer solution in which acetylene black was dispersed. At that time to be sure of contact between the electrolyte and the counterelectrode, the same polymer and the same solution were used for the counterelectrode as the electrolyte. In this case, acetylene black was dispersed in propylene carbonate which contained methyl acrylate polymer. On this counterelectrode, the protection layer 19 was used on which epoxy polymer was coated. At this time the exposed i.e. non-coated, region 20 remained for electrical contact.

The display pattern of this display device is indicated in FIG. 8. The coloring and the bleaching were performed by the applied voltage +1 V.

The response time was 0.5 sec, the same value as the solution. (Reference)

In Example 14, methyl acrylate was used to gelate propylene carbonate. Vinyl acetate which has a similar structure was tried, too.

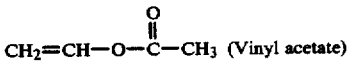

(Vinyl acetate)

As in Example 14, divinylbenezene was used as the cross-linking agent. But in this case, it is impossible to gelate the solution. When the divinylbenzene/vinyl acetate ratio was varied, in the region in which this ratio was extremely small (<0.02 in weight ratio), polymerization didn't yield a gelated solution but only a viscous solution, and in the region in which this ratio was large (>0.1 in weight ratio), only divinylbenzene was polymerized; the polymer was separated from the liquid phase. In the medium region it became difficult to polymerize. Harsher condition e.g. higher temperature, more initiator, brought only a viscous solution. As is clear from this result, reactivity of the cross-linking agent and the monomer must match properly to gelate the solution.

EXAMPLE 15

In this example, acetonitrile, which is widely used as the solvent in electrochemical systems, was gelated. The monomer was vinyl acetate, the cross-linking agent was divinyl adipate.

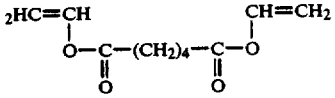

(divinyl adipate)

0.1M $LiClO_4$ acetnitrile solution was prepared, vinyl acetate and divinyl adipate and azobisisobutylonitrile were added to it. In this case also the polymerized appearance was independent of the quantity of the initiator. It was determined by the quantity of cross-linking agent and the liquid. The polymerized appearance was investigated when the quantity of the liquid and the cross-linking agent were varied (the polymerizing condition were 50° C. and 1 hr.) The results are indicated in Table 1. Compared with Example 14, it is clear that more cross-linking agent was needed than for Example 14. The reason was inferred that the solubility of vinyl acetate to acetonitrile is so high that the degree of cross-linkage must be large to gelate.

TABLE 1

| | | Cross-linking agent/monomer weight ratio | | |
|---|---|---|---|---|
| | | 0.01 | 0.02 | 0.03 |
| liquid/monomer weight ratio | 1 | gelated | gelated | gelated |
| | 2 | not gelated | not gelated | gelated |
| | 3 | not gelated | not gelated | gelated |

The conductivity was measured on the gels indicated Table 1. They were in the range 200~400 Ωcm. The conductivity of 0.1M $LiClO_4$ acetonitrile solution is c.a. 150 Ωcm. The resistance of gel was slightly higher but was not so high.

Then, in Table 1, the gel having a liquid/monomer ratio of three and a cross-linking agent/monomer ratio of 0.05 was used in the same display device as Example 14. The display film was also tungsten oxide. Then a solidified display cell was obtained. The response was 0.5 sec.

EXAMPLE 16

In this example, aqueous solution was gelated. Acrylamide, whose polymer is soluble to water, was used as the monomer, and the cross-linking agent was methylenebisacrylamide.

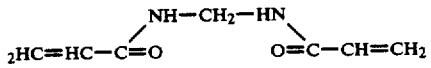

In a 1M KCl aqueous solution, acrylamide, methylenebisacrylamide and potassium persulphate as the initiator were dissolved. When this solution was warmed at 50° C., the polymerization advanced fast. The gelation was completed in 30 min. Polymerization conditions of this gel were investigated as in Tabel 2.

TABLE 2

| | | Cross-linking agent/monomer weight ratio | | |
|---|---|---|---|---|
| | | 0.0001 | 0.0005 | 0.001 |
| liquid/monomer | 5 | gelated | gelated | gelated |

TABLE 2-continued

| | | Cross-linking agent/monomer weight ratio | | |
|---|---|---|---|---|
| | | 0.0001 | 0.0005 | 0.001 |
| :ight ratio | 7 | not gelated | gelated | gelated |
| | 10 | not gelated | not gelated | not gelated |

As is clear from these results, the requisite quantity of e cross-linking is small compared with foregoing exnples.

This aqueous gel was used in the same display device Example 14 (the liquid/monomer ratio was five, the oss-linking agent/monomer ratio was 0.0005). In this ıse, the display film was not tungsten oxide, but Prusın blue.

Prussian blue film was formed by the electrochemical duction in the aqueous solution which contains ferri-ranide and ferric chloride.

The coloring and the bleaching were performed by e applied voltage +1 V. The response time was 1 sec. his was the same value as the liquid electrolyte. Delay hen using the solid electrolyte was not observed.

Further, this acrylamide gel electrolyte was adhesive, ıd once stuck to the display film, didn't strip away ıless forced to strip off. This property was observed of ›urse in Example 15.

As has been explained concretely by the examples, :cording to this invention, not only a gelated electrote is obtained, but also the response time is by no eans inferior to the liquid and its adhesive property akes it easy to handle.

What I claim is:

1. An electrochromic [display] *optical* device com-ising: at least two electrodes at least one of which is ›mprised of electrochromic material, and an electrote gel in contact with said electrodes and comprising ı electrolytic solution absorbed and thereby gelated by copolymer formed of a first monomer which when ›lymerized forms polymer soluble in the solvent of id electrolytic solution and a second monomer which hen polymerized forms polymer insoluble in the sol-ent of said electrolytic solution in a proportion such ıat said copolymer is capable of absorbing an amount ' said electrolytic solution sufficient to form a gel hich is effective as an electrolyte.

2. The electrochromic [display] *optical* device as aimed in the claim 1, in which the electrochromic aterial is tungsten oxide or molybdenum oxide.

3. The electrochromic [display] *optical* device as aimed in claim 1 in which the copolymer is comprised ' vinyl acetate and ethylene wherein the vinyl acetate present in a molar ratio of 70%–80%.

4. The electrochromic [display] *optical* device as aimed in the claim 1, in which the solvent of the elecolyte solution is propylene carbonate, and the first onomer is selected from a member of the group consting of vinyl acetate, methyl methacrylate, methyl :rylate, vinylpyridine and vinylpyrrolidone.

5. The electrochromic [display] *optical* device as aimed in claim 1, in which said second monomer is :lected from a member of the group consisting of sty-:ne, vinyl chloride, ethylene, propylene and vinyl carızole.

6. The electrochromic [display] *optical* device as aimed in claim 1, in which said copolymer is com-:ised of vinyl acetate and ethylene.

7. The electrochomic [display] *optical* device as aimed in claim 1 wherein the electrolytic solution absorbed by the copolymer is the primary current carrier.

8. An electrochromic [display] *optical* device comprising: at least two electrodes at least one of which is comprised of electrochromic material, and an electrolytic gel in contact with said electrodes and comprising an electrolytic solution absorbed and thereby gelated by a cross-linked polymer which when uncross-linked is soluble in the solvent of said electrolytic solution, and which is cross-linked to an extent which allows the polymer to absorb said electrolytic solution in an amount sufficient to form a gel effective as an electrolyte.

9. The electrochromic [display] *optical* device as claimed in the claim 8, in which the polymer is cross-linked by divinylbenzene.

10. The electrochromic [display] *optical* device as claimed in 8, in which the electrolytic solution is an aqueous solution and the polymer is polyvinyl alcohol cross-linked by a dicarboxylic acid or its anhydride.

11. The electrochromic [display] *optical* device as claimed in the claim 10, in which the cross-linking agent is pyromellitic dianhydride, maleic acid, adipic acid or maleic dianhydride.

12. The electrochromic [display] *optical* device as claimed in the claim 11, in which the pyromellitic dianhydride/polyvinyl alcohol weight ratio is more than 0.02.

13. The electrochromic [display] *optical* device as claimed in claim 8, in which the electrolyte gel is gelated by the polymerization of monomer in a solvent, wherein the resultant polymer is soluble in said solvent and said solvent is used for the electrolytic solution, and in which the polymer is cross-linked by means of a divinyl compound.

14. The electrochromic [display] *optical* device which is claimed in claim 13, in which the electrolytic solution is an aqueous solution, the monomer is acrylamide and the divinyl compound is methylenebisacrylamide.

15. The electrochromic [display] *optical* device as claimed in claim 13, in which the solvent of the electrolytic solution is propylene carbonate, the monomer is methyl acrylate, and the divinyl compound is divinylbenzene.

16. The electrochromic [display] *optical* device as claimed in claim 13, in which the solvent of the electrolytic solution is acetonitrile, the monomer is vinyl acetate, and the divinyl compound is divinyl adipate.

17. The electrochromic [display] *optical* device as claimed in the claim 8, in which the electrochromic material is tungsten oxide or molybdenum oxide.

18. The electrochromic [display] *optical* device as claimed in claim 8 in which said polymer is polyacrylamide which has been cross-linked by means of methylenebisacrylamide.

19. The electrochromic [display] *optical* device as claimed in claim 8 wherein the electrolytic solution absorbed by the polymer is the primary current carrier.

20. An electrolyte gel useful for an electrochromic [display] *optical* device comprising an electrolytic solution absorbed and gelated by a copolymer formed of a first monomer which when polymerized forms polymer soluble in the solvent of said electrolytic solution and a second monomer which when polymerized forms polymer insoluble in the solvent of said electrolytic solution in a proportion such that said copolymer is capable of absorbing an amount of said electrolytic solution sufficient to form a gel which is effective as an electrolyte.

21. The electrolyte gel as claimed in claim 20 in which the first monomer is selected from a member of the group consisting of vinyl acetate, methyl methacrylate, methyl acrylate, vinylpyridine and vinylpyrrolidone and in which said second monomer is selected from a member of the group consisting of styrene, vinyl chloride, ethylene, propylene and vinyl carbazole.

22. The electrolyte gel as claimed in claim 20 in which said copolymer is comprised of vinyl acetate and ethylene.

23. An electrolyte gel useful for an electrochromic [display] *optical* device comprising an electrolytic solution absorbed and gelated by a cross-linked polymer which when uncross-linked is soluble in the solvent of said electrolytic solution and which is cross-linked to an extent which allows the polymer to absorb said electrolytic solution in an amount sufficient to form a gel effective as an electrolyte.

24. The electrolyte gel as claimed in claim 23 in which the electrolyte is gelated by the polymerization of monomer in a solvent, wherein the resultant polymer is soluble in said solvent and said solvent is used for the electrolytic solution, and in which the polymer is cross-linked by means of a divinyl compound.

25. The electrolyte gel as claimed in claim 24 in which the monomer is acrylamide and the divinyl compound is methylenebisacrylamide.

* * * * *